E. B. LORENZEN & H. M. ARTZ.
VALVE.
APPLICATION FILED NOV. 10, 1914.

1,211,195.

Patented Jan. 2, 1917.

Witnesses
L. H. Schmidt
Amos W. Hart

Inventors
Edward B. Lorenzen.
Harry M. Artz.

By Munn & Co.
Attorneys

UNITED STATES PATENT OFFICE.

EDWARD B. LORENZEN, OF SANDUSKY, AND HARRY M. ARTZ, OF MANSFIELD, OHIO.

VALVE.

1,211,195. Specification of Letters Patent. Patented Jan. 2, 1917.

Application filed November 10, 1914. Serial No. 871,265.

*To all whom it may concern:*

Be it known that we, EDWARD B. LORENZEN, resident of Sandusky, in the county of Erie and State of Ohio, and HARRY M. ARTZ, resident of Mansfield, in the county of Richland and State of Ohio, citizens of the United States of America, have made an Improvement in Valves, of which the following is a specification.

Our invention is an improvement in a class of valves in which packing is dispensed with.

It is more particularly an improvement upon the valve for which we have received Letters Patent No. 1066240.

The details of construction, arrangement, and operation of parts are as hereinafter described, and illustrated in the accompanying drawing, in which—

Figures 1, 2:
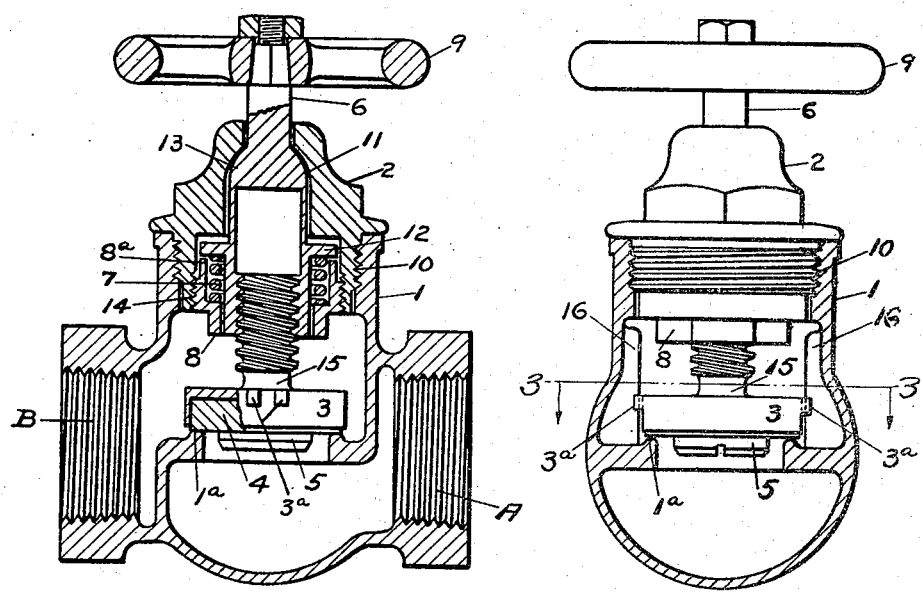
Figure 3:
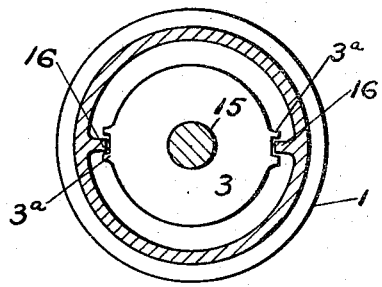

Figure 1 is a central vertical section of the valve. Fig. 2 is a vertical section at right angles to that shown in Fig. 1. Fig. 3 is a horizontal section on the line 3—3 of Fig. 2.

The body of the valve casing has open ends, providing for inlet and outlet of fluid or liquid, and the interior or chamber of the same is traversed by an angular diaphragm having an opening or passage for fluid or liquid, a valve seat 1ᵃ surrounding the same as usual in this type of valves.

A hollow cylindrical upwardly projecting portion of the casing indicated by numeral 1, is threaded internally, and a "bonnet" or crown 2 is screwed into the same, as usual in this type, and as indicated at 10. The bonnet is, however, extended downward and such extension is threaded internally, as indicated at 14 in Fig. 1. An annular nut 8 is screwed into said threaded portion 14 of the bonnet, and the same is provided with an internal shoulder, upon which is supported a spiral spring 7.

6 indicates a handle stem provided with the usual form of wheel handle 9. Its upper reduced portion passes through an opening in the bonnet 2 and its body or main portion is recessed longitudinally and screw-threaded in its lower portion to receive the threaded valve stem 15. Adjacent to the shoulder of the bonnet within the latter, the handle stem 6 is provided with a radial flange 12, against which the aforesaid spring 7 bears upward. In other words, the flange 12 forms a seat for the spring and projects over the portion 8ᵃ of the nut 8, as shown in Fig. 1, so that the flange cuts off direct passage to the upper portion of the valve. The upper portion 13 of the body of the handle stem 6 and the adjacent portion 11 of the bonnet 2, which work in contact, are constructed to form what may be termed a hemispherical joint. If the nut 8 be adjusted high enough to bring its annular vertical flange 8ᵃ into contact with the radial flange 12, pressure between the rounded surfaces 11 and 13 may be increased beyond that which can be produced by the spring alone, so that the joint remains tight, irrespective of the degree of downward pressure on the handle or hand-wheel.

The valve proper is a disk 4, which is held in a metallic cap or casing 3, and a nut 5 is applied on the underside of the disk for holding the parts securely together.

At opposite points on its sides, the valve holder 3 is provided with lugs 3ᵃ spaced apart to receive fixed vertical guides 16 formed, as shown in Figs. 2 and 3, integrally with the casing or body of the valve. It is apparent that this construction and combination of parts prevents the valve rotating with the handle stem 6, as required for adjusting the valve for opening or closing it.

What we claim is:

The combination with a valve casing having an internal valve-seat and a removable bonnet, of a valve and valve stem, a handle stem which screws on the valve stem and is provided with a horizontal flange, a nut screwed into the bonnet and having an internal shoulder and a vertical annular extension adapted for contact with said flange, a spiral spring surrounding the handle stem and interposed between the horizontal flange and the shoulder of the nut, the upper contacting portions of the body and stem being hemispherical, as described.

EDWARD B. LORENZEN.
HARRY M. ARTZ.

Witnesses to the signature of Edward B. Lorenzen:
HENRY SCHOEPFLE,
WALTER D. JENNIS.

Witnesses to the signature of Harry M. Artz:
C. L. McCLELLAN,
CHAS. BUEMFIELD.

Copies of this patent may be obtained for five cents each, by addressing the "Commissioner of Patents, Washington, D. C."